United States Patent
Goss et al.

(10) Patent No.: US 9,158,700 B2
(45) Date of Patent: Oct. 13, 2015

(54) STORING CACHED DATA IN OVER-PROVISIONED MEMORY IN RESPONSE TO POWER LOSS

(75) Inventors: Ryan J. Goss, Prior Lake, MN (US); David S. Seekins, Shakopee, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 173 days.

(21) Appl. No.: 13/354,559

(22) Filed: Jan. 20, 2012

(65) Prior Publication Data
US 2013/0191578 A1    Jul. 25, 2013

(51) Int. Cl.
G06F 12/00 (2006.01)
G06F 12/10 (2006.01)
G06F 12/08 (2006.01)

(52) U.S. Cl.
CPC ............ G06F 12/10 (2013.01); G06F 12/0866 (2013.01); *G06F 2212/214* (2013.01)

(58) Field of Classification Search
CPC .................................................. G06F 12/0866
USPC .................................................. 711/162, 102
See application file for complete search history.

(56) References Cited

U.S. PATENT DOCUMENTS

| | | | |
|---|---|---|---|
| 7,003,620 B2 | 2/2006 | Avraham et al. | |
| 7,634,688 B2* | 12/2009 | Madter et al. | 714/24 |
| 7,983,107 B2* | 7/2011 | Moshayedi et al. | 365/228 |
| 8,127,048 B1* | 2/2012 | Merry et al. | 710/8 |
| 8,479,080 B1* | 7/2013 | Shalvi et al. | 714/774 |
| 2002/0049917 A1 | 4/2002 | Portman et al. | |
| 2008/0282045 A1* | 11/2008 | Biswas et al. | 711/159 |
| 2009/0031099 A1* | 1/2009 | Sartore | 711/162 |
| 2009/0222627 A1* | 9/2009 | Reid | 711/135 |
| 2009/0292887 A1* | 11/2009 | Manczak et al. | 711/162 |
| 2010/0169543 A1* | 7/2010 | Edgington et al. | 711/103 |
| 2010/0235568 A1* | 9/2010 | Inamura | 711/103 |
| 2010/0293337 A1* | 11/2010 | Murphy et al. | 711/136 |
| 2010/0329065 A1 | 12/2010 | Johnston et al. | |
| 2011/0010488 A1* | 1/2011 | Aszmann et al. | 711/103 |
| 2011/0010489 A1* | 1/2011 | Yeh | 711/103 |
| 2012/0272107 A1* | 10/2012 | Cadloni | 714/718 |

* cited by examiner

*Primary Examiner* — Cheng-Yuan Tseng
*Assistant Examiner* — Zubair Ahmed
(74) *Attorney, Agent, or Firm* — Hollingsworth Davis, LLC

(57) ABSTRACT

A power loss condition is detected that affects volatile data that is cached in preparation for storage in a non-volatile, solid-state memory device. The volatile cached data is stored in an over-provisioned portion of the non-volatile, solid-state memory device in response to the power loss condition.

12 Claims, 6 Drawing Sheets

STORING CACHED DATA IN OVER-PROVISIONED MEMORY IN RESPONSE TO POWER LOSS

SUMMARY

Various embodiments described herein are generally directed to methods, systems, and apparatuses that facilitate storing cached data in over-provisioned memory in response to power loss. In one embodiment, a method involves detecting a power loss condition affecting volatile data that is cached in preparation for storage in a non-volatile, solid-state memory device. The volatile cached data is stored in an over-provisioned portion of the non-volatile, solid-state memory device in response to the power loss condition.

In another embodiment, a method involves detecting a power loss condition affecting volatile data that is cached in preparation for storage in a non-volatile, solid-state memory device. The non-volatile, solid-state memory device includes advertised and over-provisioned portions, and the non-volatile, solid-state memory device is acting as a cache for a lower tier, non-volatile data storage device. The method further involves determining that the advertised portion is unable to accept the volatile data in response to the power loss condition, and in response thereto, storing the volatile cached data in an over-provisioned portion of the non-volatile, solid-state memory device.

In another embodiment, an apparatus includes a memory interface configured to access a non-volatile, solid-state memory. The apparatus includes a controller configured to define two or more logical zones of the non-volatile, solid-state memory. The logical zones are differentiated based on parameters defining on any combination of read/write access and class of service. The controller regulates host access to the logical zones based on the constraints These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

Figure 1:
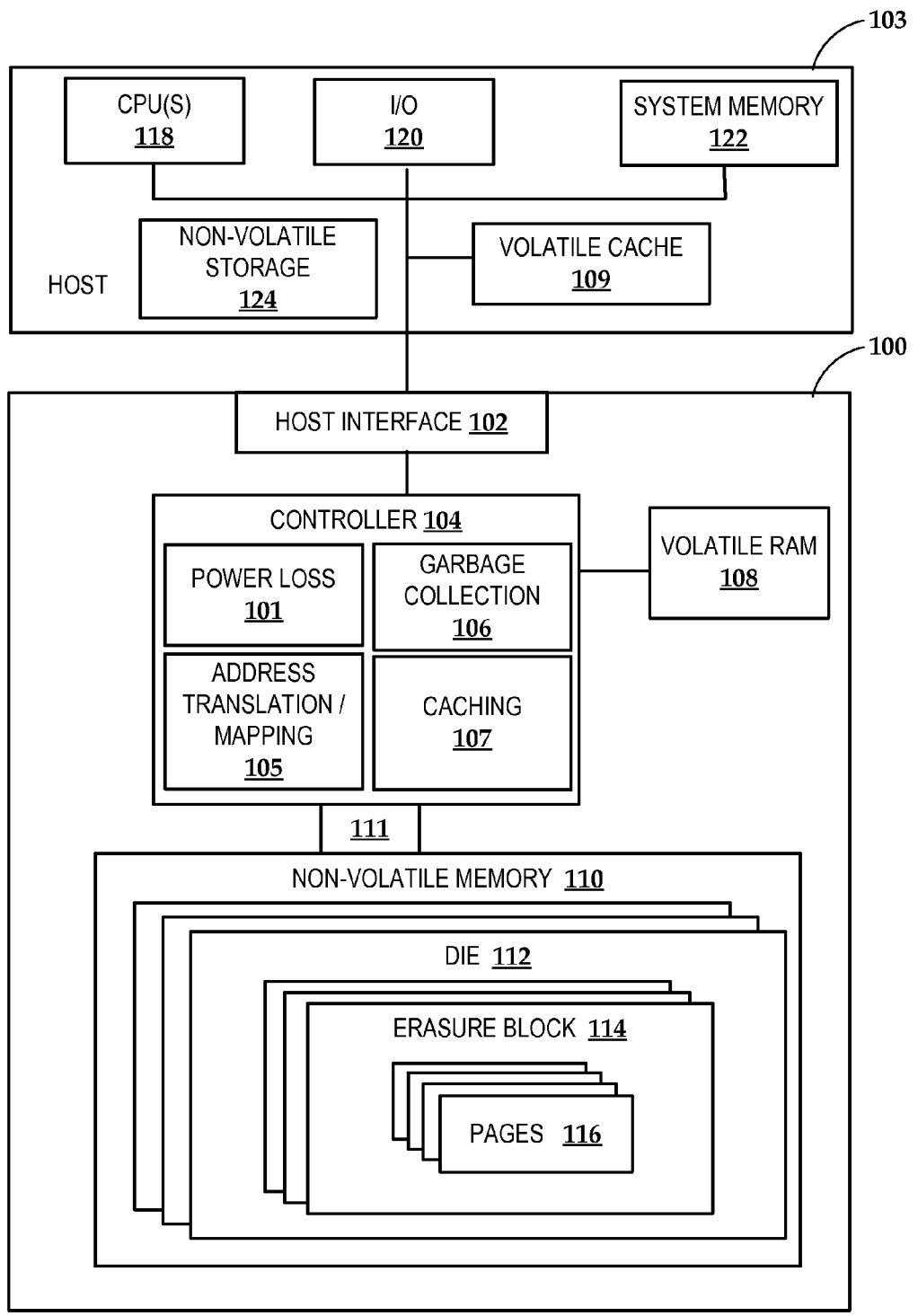
FIG. 1 is a block diagram illustrating an apparatus according to an example embodiment.

The present disclosure relates generally to systems for persistent storage of computer data. For example, systems, apparatuses, methods, and computer-readable media are described that facilitate retaining cached data upon a power loss event. Volatile data may be cached in preparation for storage in a non-volatile, solid-state memory device, such as a solid state drive (SSD). In response to a power loss condition, the volatile cached data is stored in an over-provisioned portion of the non-volatile, solid-state memory device, the over-provisioned portion being used for managing write amplification in the solid-state memory device. As will be described in more detail below, the over-provisioned memory portion may have characteristics that make it suitable for storing the cached data under circumstances such as unexpected power loss.

Modern computer systems may manage both volatile and non-volatile memory using tiered access systems. Such systems can provide an optimal balance between high data throughput and low cost. For example, most modern central processing units (CPUs) employ one or more levels of cache memory that resides between the CPU and system random access memory (RAM), e.g., dynamic RAM (DRAM). The cache may be much faster than the system RAM, but is also more expensive. As a result, the amount of cache memory is orders of magnitude less than the system RAM. There may be multiple layers of cache (e.g., L1, L2) and generally, the faster, smaller memory is closer to the CPU, whereas the larger, slower cache is closer to the system RAM.

When performing a memory load/store operation, the CPU may first check whether the desired data is stored in the cache. If so, the data can be read from/written to the cache more quickly than if the same operation had to be performed directly with system RAM. If not, the data can be accessed from system RAM, and possibly moved to the cache for future access operations. This may increase performance when performing certain operations, such as those involving repeated access to particular portions of memory. The amount of fast but expensive cache memory is small compared to the slower but cheaper system RAM, and so a tiered system can exhibit an increase performance without significant increase in cost.

An analogous tiered system may also be employed for non-volatile storage, e.g., storage sent to a hard disk drive (HDD) or other persistent storage device. Between the CPU and persistent storage device, there may be multiple tiers of volatile and non-volatile memory acting as a cache for the subsequent layers. Similar to the CPU's volatile memory cache, the non-volatile memory cache may include faster and smaller caches closer to the processor. For example, a server may use DRAM to cache data before it enters the persistent storage system via, e.g., a peripheral input/output bus.

While HDDs may continue to be relied upon for persistent storage, such as in large-scale enterprise servers, small form-factor solid-state drives (SSDs) are now also being used as direct-attached storage inside servers. In some configurations, an SSD-type device may act as an intermediary storage for other layers of storage, e.g., similar to a hybrid HDD that uses a large non-volatile RAM (NVRAM) as cache for lower layers of magnetic disk storage. The present disclosure describes at least a volatile memory cache that holds data in preparation for storage to a non-volatile solid-state memory device, and the latter device may also be used in conjunction with other layers of storage such as HDDs.

It should be noted that the term "SSD" may be used herein interchangeably with terms such as "non-volatile solid state memory device." Use of the term "SSD" is not meant to limit the described embodiments to only the physical or electrical interfaces and configurations associated with commercially available SSDs. It will be apparent to one of ordinary skill in the art that that uses of an SSD as described herein may be applicable to any known or future non-volatile, solid-state memory device and sub-systems thereof.

Non-volatile solid-state memory may exhibit faster data transfer performance than a hard drive. As a result, such devices can be used as standalone replacement for an HDD and/or as a cache for an HDD. One difference between, e.g., an SSD and an HDD, is that the memory cells of an SSD have a finite life, measured as a function of number of erase/write cycles applied the memory cells. While an HDD may also exhibit wear (e.g., mechanical wear) that limits life of the device, the magnetic disks that are used as data storage media are not considered to be life-limited based on the number of erase/write cycles applied.

A data storage system designer needs to take into account that storage media of solid-state, persistent storage devices may wear over time. While non-volatile solid-state memory is physically durable (e.g., highly resistant to effects of shock and vibration), the memory storage cells within such devices have a finite electrical life. That is, a cell may be written and erased a finite number of times before the structure of the cell may become physically compromised. Thus, a system may still utilize volatile RAM (e.g., DRAM) as a cache layer in front of non-volatile, solid-state memory.

Dynamic RAM can be effective as a cache in front of an SSD because of DRAM's high endurance and relatively high speed. However, in the event of power-loss, the DRAM is volatile and the data must be written to persistent storage or it will be lost. During an orderly/expected power transitions, e.g., when the operating system directs the system to shut down, the system will ensure these caches are flushed before power is removed. However, in some cases, the power may be removed unexpectedly, leaving very little time to deal with data cached in DRAM or the like. The hardware may have enough power stored up (e.g., in capacitors) to transfer data from DRAM to an SSD, as the SSD uses little power compared other forms of non-volatile storage such as HDDs.

While an SSD may be used to store data from a DRAM cache upon unexpected power loss, in some cases there may be no available storage space on the SSD. For example, where the SSD acts as a cache for another storage system, the SSD may be fully utilized, e.g., all of the advertised storage capacity of the SSD is in use for its own layer of cache. When all of the logical block addresses (LBAs) of an SSD are utilized (e.g., the cache is full) storage space must be freed prior to accepting new data from the DRAM. In order to free up storage space, this could mean writing some data from SSD to the lower-tier storage. However, during power-loss there may not be enough time for that migration of data.

One solution is to use a battery to power the system long enough to successfully flush all DRAM data to some non-volatile memory, which may be outside the normal storage system. However, a battery adds cost, complexity and another failure point for the system. Instead, an SSD (or similar device) may have extra storage that, while not advertised to the system, may be made available to store DRAM cache for purposes such as preventing data loss in response to an unexpected power loss.

In reference now to FIG. 1, a block diagram illustrates a non-volatile solid-state memory apparatus 100 (such as an SSD) according to an example embodiment. The apparatus 100 is configured to act as a power-safe backup for cache data from a host system 103 by repurposing over-provisioning functionality of the apparatus 100. The apparatus 100 may be any type of persistent solid-state storage device, including a solid-state drive (SSD), thumb drive, memory card, embedded device storage, etc. The apparatus 100 may include a host interface 102 facilitates communications between the apparatus 100 and the host system 103, e.g., a computer.

The apparatus 100 includes one or more controllers 104, which may include general- or special-purpose processors that perform operations of the apparatus. The controller 104 may include any combination of microprocessors, digital signal processor (DSPs), application specific integrated circuits (ASICs), field programmable gate arrays (FPGAs), or other equivalent integrated or discrete logic circuitry suitable for performing the various functions described herein.

Functions that may be provided by the controller 104 include power loss detection, address translation/mapping, garbage collection, and caching, which are represented here respectively by functional modules 101, 105, 106 and 107. The modules 101, 105-107 may be implemented using any combination of hardware, software, and firmware. The modules 101, 105-107 may cooperatively perform functions related to managing overprovisioned memory as described herein.

The controller 104 may use local volatile random-access memory (RAM) 108 during operations. The RAM 108 may be used, among other things, to cache data read from or written to non-volatile memory 110, map logical to physical addresses, and store other operational data used by the controller 104 and other components of the apparatus 100. The host 103 may also include volatile memory 109 that is used as a cache for the apparatus 100 instead of or in addition to RAM 108.

The non-volatile memory 110 includes the circuitry and media used to persistently store both user data and other data managed internally by apparatus 100. The non-volatile memory 110 may include one or more flash dies 112, which individually contain a portion of the total storage capacity of the apparatus 100. The memory contained within individual dies 112 may be further partitioned into blocks, here annotated as erasure blocks/units 114. The erasure blocks 114 represent the smallest individually erasable portions of memory 110. The erasure blocks 114 in turn include a number of pages 116 that represent the smallest portion of data that can be individually programmed and/or read. In a NAND configuration, for example, the page sizes may range from 512 bytes to 4 kilobytes (KB) and up, and the erasure block sizes may range from 16 KB to 512 KB and up. It will be appreciated that the present embodiments described herein are not limited to any particular size of the pages 116 and blocks 114, and may be equally applicable to smaller or larger data unit sizes.

It should be appreciated that an end user of the apparatus 100 (e.g., host 103) may deal with data structures that are smaller than the size of individual pages 116. Accordingly, the host 103 and/or controller 104 may buffer data in one or more of the volatile caches 108, 109 until enough data are available to program one or more pages 116. The buffered data may also be subject to a large amount of current read/write activity, and so it may be more efficient to perform those operations in a cache 108, 109 rather than in non-volatile memory 110. The controller 104 may also maintain LBA to physical address mappings in the volatile RAM 108 as these mappings may, in some cases, may be subject to frequent changes based on a current level of write activity. The controller 104 may access the non-volatile memory 110 via a memory interface 111. The memory interface 111 includes at least circuitry and protocols resident with the controller 104, and is operable with bussing and interface modules of the non-volatile memory 110.

The host 103 may include computing components such as central processing units (CPUs) 118, input/output circuitry 120, and system memory 122. The host may use the apparatus 100 as a lowest level of persistent storage, or the apparatus 100 may be acting as an intermediate level of cache for another layer of non-volatile storage 124 (e.g., hard disk drive). The host 103 and apparatus 100 may be commonly coupled to a power supply (not shown), or may include separate power supplies/sources. Generally, upon unexpected loss of power of one or both of the apparatus 100 and host 103, the data stored in one or both of the volatile memory 108, 109, may need to be quickly saved in a non-volatile memory, otherwise data targeted for non-volatile storage could be lost or corrupted.

The non-volatile memory 110 in the apparatus 100 may include a solid state medium such as flash memory. The actual storage capacity of the memory 110 is generally larger than the advertised capacity. This is due to what sometimes referred to as overprovisioning of the memory 110. Overprovisioning is implemented due to the way solid state memory writes data, which is different than magnetic storage media.

In a magnetic media such as a disk drive, each unit of data (e.g., byte, word, sector) may be arbitrarily overwritten by changing a magnetic polarity of a write head as it passes over the media. In contrast, solid state memory cells are first erased by applying a relatively high voltage to the cells before being written, or "programmed." For a number of reasons, these erasures are often performed on blocks of data (also referred to herein as "erase units").

An erase unit 114 may include any number of data blocks that are treated as a single unit. In the illustrated implementation, the erase units are larger than the data storage units (e.g., pages 116) that may be individually read or programmed. In such a case, when data of an existing page 116 needs to be changed, it may be inefficient to erase and rewrite the entire block 114 in which the page resides, because other data within the block may not have changed. Instead, it may be more efficient to write the changes to empty pages in a new physical location, remap the logical to physical mapping via the translation layer 105, and mark the old physical locations as invalid/stale.

After some time, a threshold number of data storage units within a block may be marked as stale due to changes in data stored within the block. As a result, it may make sense to move any valid data out of the block to a new location and erase the block so that the block is freshly available for programming. This process of tracking invalid/stale data units, moving of valid data units from an old block to a new block, and erasing the old block is sometimes collectively referred to as "garbage collection." Garbage collection may be triggered by any number of events. For example, metrics (e.g., a count of stale units within a block) may be examined at regular intervals and garbage collection may be performed for any blocks for which the metrics exceed some threshold.

Operations such as garbage collection may cause a single write request to cause more than one write operation to be performed by the controller. This increase in write activity is generally referred to as write amplification. Many factors may affect write amplification, including whether writes from host are sequential/random, wear leveling, garbage collection, the amount of free data storage space, etc.

In order to minimize performance penalties associated with write amplification, a manufacturer may overprovision the device with extra memory. This extra memory is invisible to the host 103, and used internally by the device firmware 104 to improve performance. For example, the overprovisioned space can be used for writing data to a nearly-full drive without immediately performing garbage collection. The garbage collection can then be scheduled for a later time when the device is idle, thereby improving performance at the time the data is being written.

Overprovisioning may also be used to improve long term reliability. Memory cells can undergo a statistically derived number of erase-write cycles before wearing out. As with any statistical population, a certain number of cells can be expected to fail prematurely. Overprovisioning can ensure that a premature failure of some amount of cells does not lead to a reduction in the amount of advertised capacity over the expected life of the device. Further, overprovisioning provides a greater population of cells over which the wear can be distributed.

As previously indicated, upon unexpected power failure, there may be data in one or more volatile caches 108, 109 that needs to be saved to prevent data loss/corruption. The non-volatile memory 110 of apparatus 100 may be a good candidate for storing the cache data 108, 109. The apparatus 100 may be able to perform a write more quickly and using less power than another device such as an HDD. This may allow the use of relatively simple and reliable power storage devices such as capacitors to be used to ensure the volatile data gets saved. However, if the advertised capacity of the apparatus 100 is not sufficient to store the cached data, then there is a risk that the cache data will be lost.

To more fully ensure that apparatus 100 can store volatile cache data upon unexpected power loss, the apparatus 100 (either alone or in combination with the host 103) may include features that enable the volatile cache data to be stored into the available extra capacity (e.g., overprovisioned portion) of the apparatus 100 that may normally be reserved (e.g., for minimization of write amplification). The overprovisioned portion may not be needed by the apparatus 100 for purposes of minimizing write amplification during the power-loss operation. As a result, the OP can be repurposed to store the volatile cache data. This can virtually increase the capacity of the SSD for a short period of time.

A power loss may be detected by module 101 of the apparatus 100. In response to power loss, the apparatus 100 may have a number of internal operations to "harden" internally managed data, e.g., cause the data to be persistently stored. When power-loss is detected, a functional module (e.g., caching module 107) can also tell the apparatus 100 to store the volatile cache data 108, 109 into the overprovisioned portion of memory 110. This could be accomplished with a special power-loss indicator either in-band or out-of-band.

Figure 2:
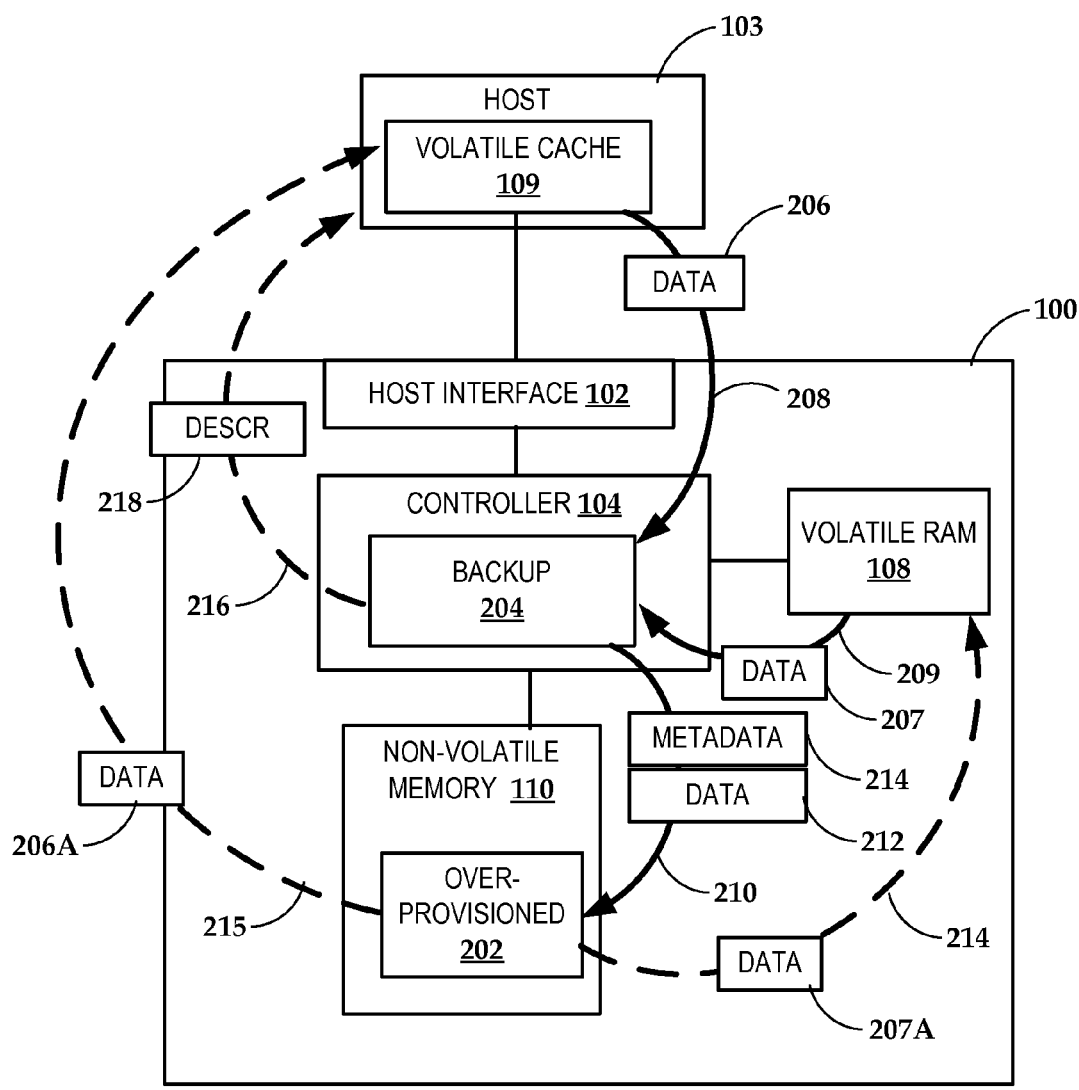
FIG. 2 is a block diagram illustrating operations in response to a power loss event according to an example embodiment.

In reference now to FIG. 2, a simplified diagram illustrates further details of the operation of various embodiments in response to a power loss event. In this diagram, a portion 202 of the non-volatile memory 110 is designated as overprovisioned. Some or all of this overprovisioned memory 202 may be designated as reserved for power loss data storage. A functional module 204 is depicted as performing some power loss backup functions via the one or more controllers 104. This module 204 may include functionality of any modules 101 and 105-107 shown in FIG. 1, and operation of the module 204 may be distributed between multiple operational units/processors.

In response to a power loss, events 208, 209 are initiated that cause extra data 206, 207 to arrive from one or more volatile cache systems 108, 109. The module 204 can store 210 the extra cache data 212 (which may be combined from the various sources 206, 207) into the power-loss reserved area 202. The module 204 may also create special metadata 214 that describes the extra cache data 212. Both the data 212 and metadata 214 may be stored 210 in the over-provisioned portion 202.

Upon a power recovery (generally represented by dashed arrows 214-216) the apparatus 100 could then be requested to restore 214, 215 the extra cache data 207A, 206A to the cache system 108, 109. Cache data 207A could be managed internally during startup procedures of the apparatus 100. For example, the apparatus could store 214 the data 207A back into volatile RAM 108 as shown, or may process it back to non-volatile memory 110, e.g., similar to flushing of a cache.

Prior to resuming normal I/O operations after the power loss event, the apparatus 100 could notify the host system 103 about the extra cache data 206A, 207A present in the over-provisioned portion 202. As part of this notification, the apparatus 100 can send 216 description information 218 (e.g., based on metadata 214) as to the size and/or state of the restored data 206A, 207A. The host 103 could then request the return 215 of the saved cache data 206A, and restore this data 206A into its cache 109. In some situations, the host 103 could request that the apparatus 100 to forget about the data 206A. In either case, the host 103 is able to make a choice as to restore or forget the saved cache data 206A, and the data 206A can thereafter be deleted from the apparatus 100. The over-provisioned portion 202 can then be restored for its previous purpose, e.g., minimizing write amplification, and the apparatus 100 can then be ready for accepting normal host traffic.

Figure 3:
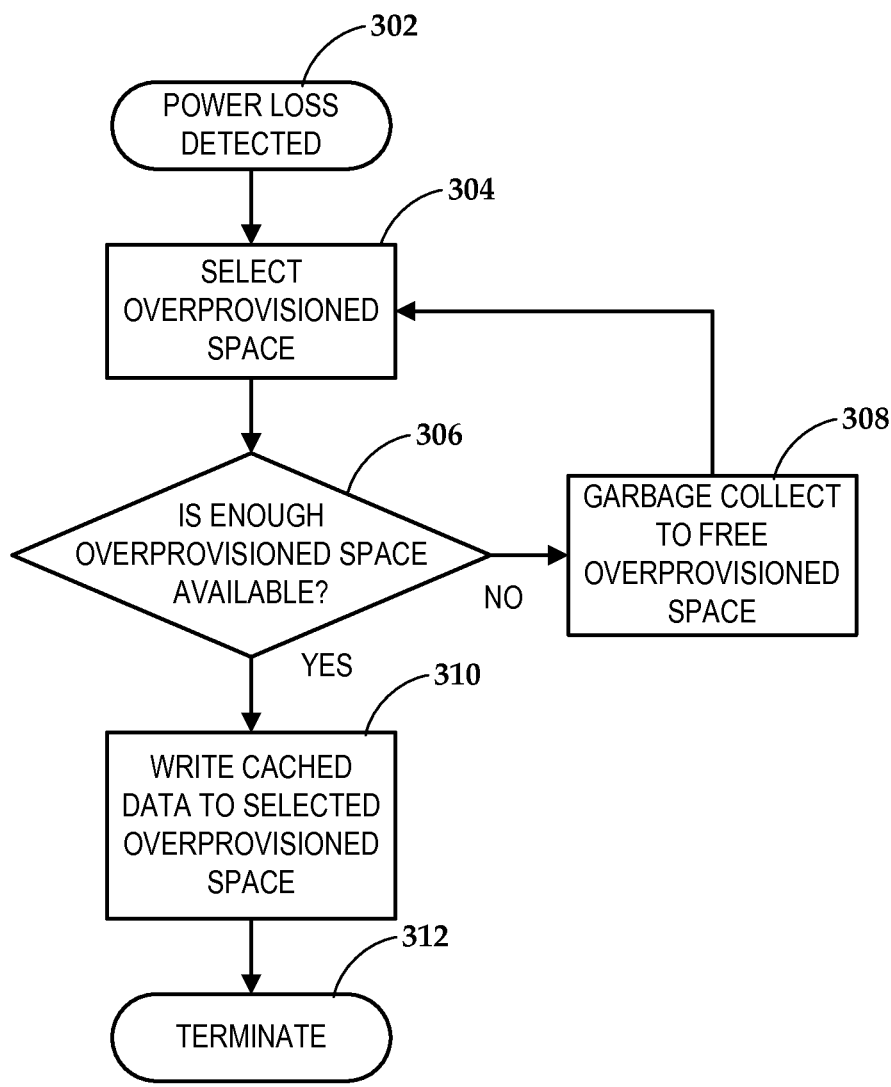
FIG. 3 is a flowchart of a procedure according to an example embodiment.

In reference now to FIG. 3, a flowchart illustrates a procedure according to an example embodiment. The procedure may at least be triggered upon detection 302 of power loss, although other events (e.g., kernel panic, power mode change) may also trigger similar procedures. Upon detection 302 of the triggering event, a controller selects 304 over-provisioned memory space. This selection 304 may have been performed in whole or in part before the event 302, and the selection 304 may involve looking up a reference to that space. In other arrangements, some portion of the selected over-provisioned space may be dynamically selected in response to event 302.

In either event, it may be necessary to determine 306 whether sufficient space is currently available and/or has previously been reserved. If not, a garbage collection operation 308 may need to be performed. This operation 308 may generally involve moving valid data from erasure blocks that have some mixture of valid and stale data units, and then erasing the erasure block. This operation 308 may be limited to free up just enough space to fulfill the selection request 304. If enough over-provisioned memory is available, the cached data can be written 310 to the over-provisioned space, and the procedure can terminate 312.

The usage of the apparatus 100 as the power-safe backup for an internal and/or host cache can reduce the system costs by removing the need for another memory management system in the storage hierarchy by reusing the SSD for both primary data storage and power-safe cache back-up. This allows the system designers to shut down all other storage components (e.g., HDDs) at a lower tier upon unexpected power loss. The apparatus 100 may be configured, in response to an unexpected power loss event, to forgo any further data transfers targeted to the lower tier memory, and make the overprovisioned portion available to receive cache data. The backup power that would have used to save cache data this other memory management memory system (e.g., HDD) can be used instead store the cache into the solid-state storage apparatus 100.

In some situations (e.g., where the apparatus 100 is acting as a cache layer for HDD storage pool) the apparatus 100 may handle writing of data differently in response to power loss events. During a normal write operation, the storage system may first demote some data from the apparatus 100 into the rest of the storage pool before performing a new write (assuming all logical block addresses in the apparatus 100 are already allocated). This requires the entire storage hierarchy to be active. However, if the write operation is still in progress after power loss is detected, the apparatus capacity "grows" to allow the host system to storage some amount of data into the over provisioning space without moving any data down to the lower storage levels in the hierarchy. This can be accomplished, for example, by performing garbage collection to reclaim stale space. The amount of space to make available could be configurable via a communication mechanism with the host. The host can ask for anywhere from 0%-OP % of space on power-loss, where OP % is the full amount of currently overprovisioned memory space. The difference is the amount of time the host and/or apparatus 100 must provide in order to reclaim that much space and store the "extra" data.

A solid-state storage apparatus 100 may include additional features to facilitate storing data under power-loss conditions. For example, a storage system may present multiple logical zones to the host system which are intermixed on the physical storage media, but represent different usage storage, retention, performance, and reliability characteristics for each logical zone. Some of these zone features may be useful when trying to find overprovisioned memory in which to store a volatile cache in response to a power outage.

In current storage devices the entire logical address pool may be presented to the storage system as a single zone in terms of usage, storage, retention, performance, and reliability constraints placed on it. This means that if a user of a storage device wants to store data with different constraints it may require a different physical storage device. The storage on these individual devices may not be available for use as anything other than as it is specified (e.g. high reliability, high speed, etc.). This includes space that may currently be unused or storing stale information that is no longer relevant to the host systems storage needs. It may also include logical capacity that has not yet been written, or has been deleted from the storage pool.

Figure 4A:
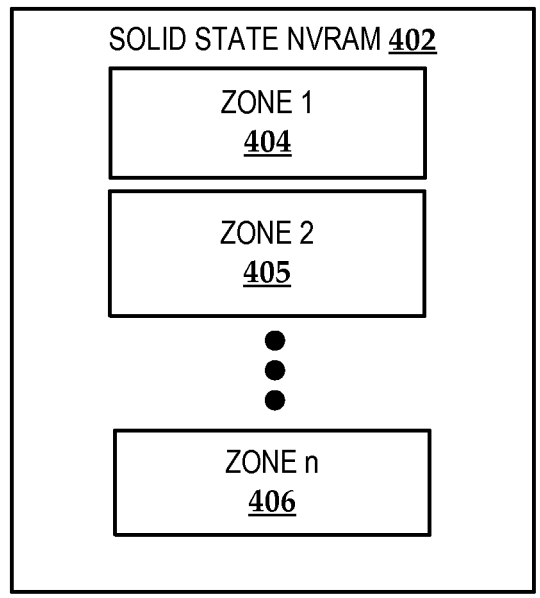
FIGS. 4A and 4B are block diagrams illustrating arrangements of non-volatile memory zones according to example embodiments.
Figure 4B:
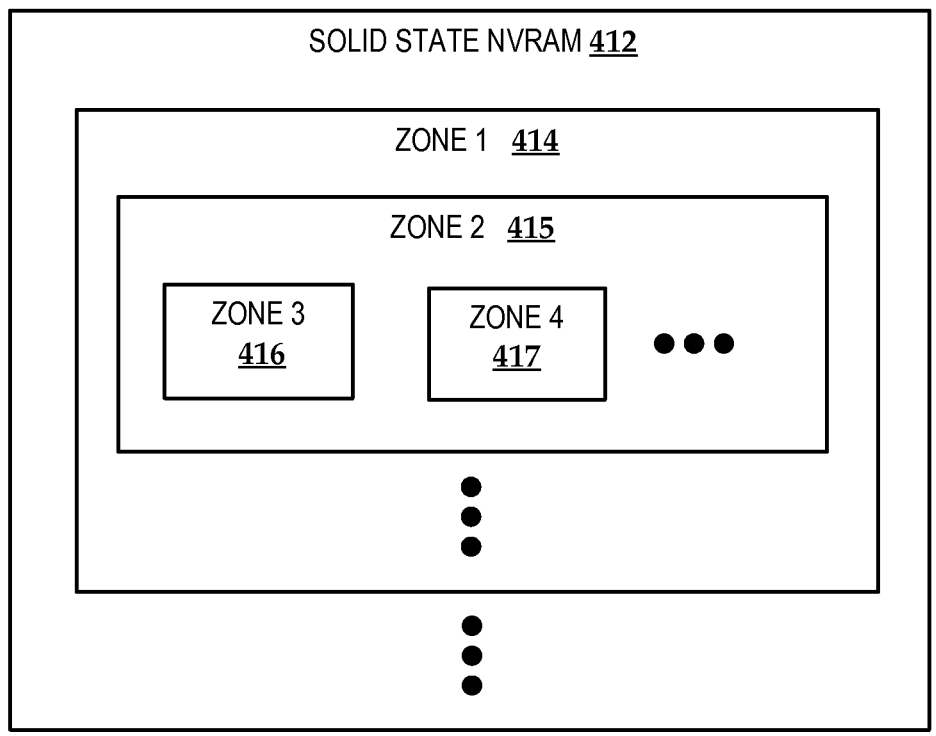

In one embodiment, the memory subsystem can be divided into different zones, as shown by way of example in FIGS. 4A-4B. In FIG. 4A, a segment 402 of non-volatile, solid-state memory is divided into separate zones 404-406. Each of these zones 404-406 may be designated by logical and/or physical identifiers, and each may specify a different set of performance parameters describing characteristics such as retention, performance, and reliability. These parameters can be used, for example, to rank the zones 404-406 based on class of service (e.g., speed, latency, reliability), read/write access, etc.

In FIG. 4B, a non-volatile memory segment 412 also includes zones 414-417 that may be ranked differently based on service parameters. In this arrangement, the logical and/or physical blocks of zone 415 are within zone 414, and similar for blocks of zones 416, 417 within zone 415. This may allow, for example, a higher performance zone (e.g., zone 412) to allocate sub-blocks at a lower priority as needed. In these and other arrangements, the size of each of the logical zones 404-406 and 414-417 may be sized dynamically based on the requirements of the host system for each of the logical zones. This allows for the host system to change the size or constraints of one zone, and provide or consume additional resources of another zone.

A storage system according to one embodiment may be able to present multiple logical zones to the host system. The multiple logical zones may be intermixed on the physical storage media, but represent different usage, storage, retention, performance, and reliability constraints for each logical zone. This allows for the capacity of the same storage device to be used by the host system in multiple different ways. Further, the host may be able to configure the storage, retention, performance and reliability constraints uniquely for each logical zone. The host and/or storage system may regulate access to the zones based on constraints defined for the zones.

Figure 5:
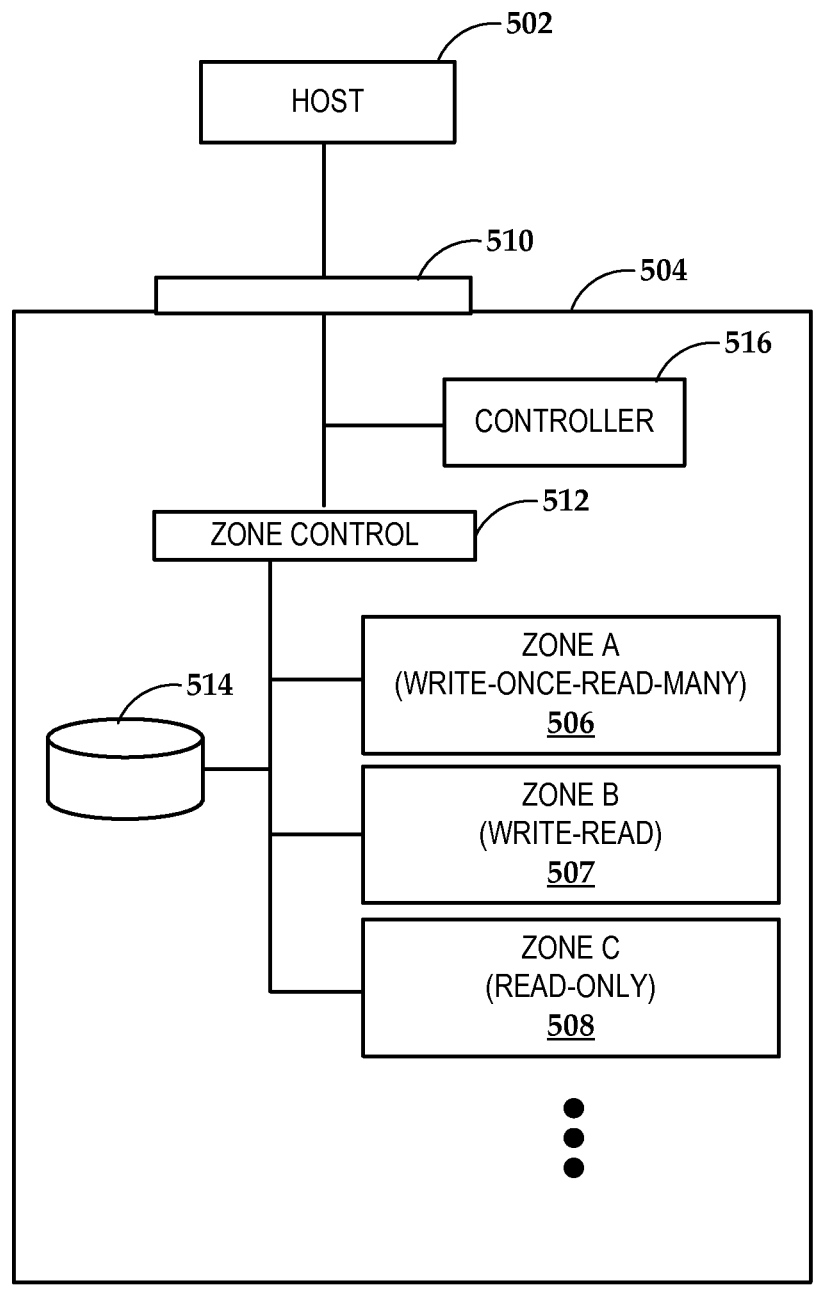
FIG. 5 is a block diagram illustrates a host dynamically establishing zones on an non-volatile, solid-state memory device according to an example embodiment.

In FIG. 5, a block diagram illustrates an example of a host 502 dynamically establishing zones 506-508 on an SSD-type device 504. This dynamic configuration may involve setting constraints that allows a storage system to set up logical partitions such as a write-once-read-many (WORM) zone 506, a single usage write-read zone 507, a read-only (RO) zone 508, or any other unique usage criteria applicable to multiple logical zones. The host 502 may communicate through a standard interface 510 used by HDDs, SSDs, etc.

The zones 506-508 may be internally configured via a zone control component 512, which may include any combination of controller, command set, application program interface, etc., suitable for this purpose. By way of example, the illustrated apparatus 504 includes a main controller 516 that may perform some or all functions of the zone control component 512, and/or work separately with a separate processor (not shown) that performs some or all functions of zone control component 512. The zone control component 512 may maintain a mapping database 514 that records constraints associated with the zones.

Based on the constraints (e.g. such as performance, reliability, read/write access) the number of different zones, as well as the capacity of each logical zone may be reduced. If the host system 502 requests a large amount of capacity to be very fast and very reliable, there may be more usage of the physical resources. The type of zone (e.g., WORM, RO) may be changed by the host 502, such that a zone initially configured as write-read may be changed to read only later by the host 502 based on application-specific conditions known by the host. In such a case, the control component 512 may perform actions such as remapping, garbage collection, etc., to more efficiently use the memory based on this information.

Such a system may provide different methods for addressing the multiple logical zones 506-508. This may allow, for example, the host system 502 to uniquely identify to the storage device 504 which zone is being accessed and therefore what action to perform based upon the request. This includes having different handling of write and read commands at different processing rates. The different addressing methods could also result in error conditions reported if the host system is attempting to use the storage zone in a way that violates the zone constraints, such as writing multiple times to a write-once zone.

Figure 6:
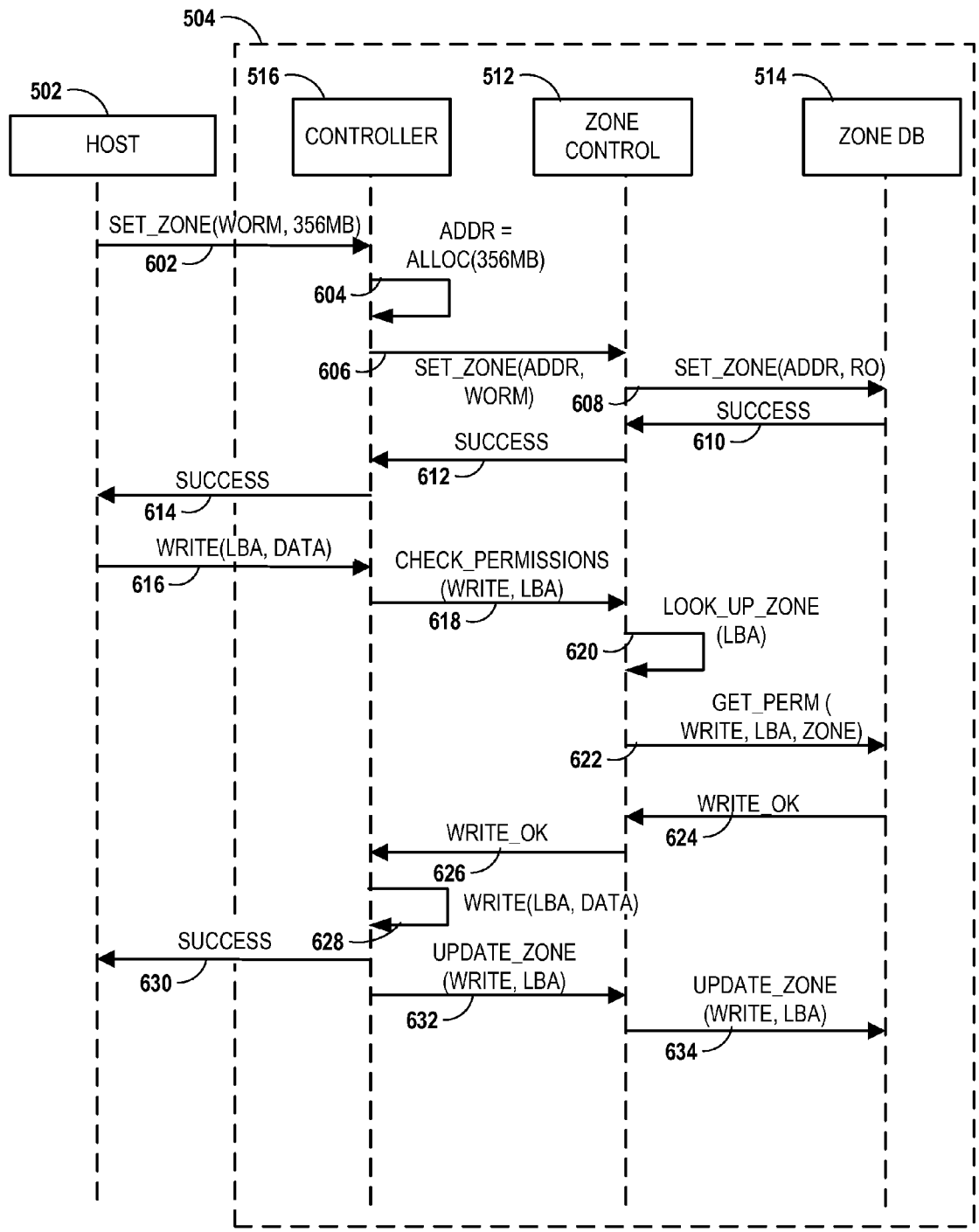
FIG. 6 is a sequence diagram illustrating interactions between a host and data storage apparatus to manage zone-mapped memory according to an example embodiment.

In reference now to FIG. 6, a sequence diagram illustrates an example of interactions between host 502 and apparatus 504 to manage zone-mapped memory. In this example, the host 502 sends a command 602 to set a particular zone, in this case to WORM-type zone, and also a size of the data requested. The command 602 may reference a range of LBAs of which the host 502 is already aware, in which case other data may be sent instead of size of the zone. Because the request 602 involves the host 502, the command 602 or responses thereto will generally make reference to logical addresses, and not physical addresses, the latter being maintained privately by the apparatus 504.

In the event that the zone 602 is not already established, the controller 516 may allocate/reserve/assign 604 a block of addresses for the requested zone. This step 516 may involve internal operations performed by the processor 516 under other conditions, such as mapping of LBAs to physical addresses. The processor 516 may also communicate the zone information 606 to the zone controller 512. The zone controller 512 may, among other things, update 608, 610 the database 514 and indicates 612 success or failure to the controller 516, which in turn notifies 614 the host.

Thereafter, when the host 502 performs an operation such as write 616, the controller 516 may first check 618 with the zone controller 512 to verify the operation is allowed. The controller 512 may first perform a lookup 620 in case the write 616 references an LBA alone. The controller 512 then checks 622 the database 514. In this case, it may be assumed that the write request 616 occurred just after zone allocation 614, therefore at least one write to this location is allowed. This is indicated 624, 626 to the controller 516, which completes the write 628 and indicates the result 630 to the host 502. The controller 516 may also update the zone information 632, 634 based on the write being successful. Thereafter, if another write is attempted in this LBA range (which is part of the host-defined WORM zone), the controller 516 may return an error to the host 502 indicating the request violates zone permissions based on this data stored in the database 514.

It will be appreciated that a sequence similar to that shown in FIG. 6 may be used for other purposes besides regulating access to the zones, such as changing, deleting, resizing, reallocating, updating, and/or remapping of zones. Also, there may be a variety of ways the zones could be identified and accessed by both the host 502 and internally within the device 504. For example, all data access operations (read, write, etc.) may require specifying a zone, or zone identifiers may be optional. The LBAs used by the host 502 to access particular blocks of memory may be global or zone-specific. The zone controller 512 may also be limited to viewing LBAs instead of physical addresses, or the zone controller 512 may also perform some logical-to-physical mapping, therefore requiring knowledge of physical addresses. Zones may be tied to specific memory block, or they may overlap. For example, a high-level zone may be defined as write-read and contain two or more sub-zones having different performances constraints. Similarly, a zone that is defined to provide a particular quality of service may have sub-zones that are alternatively write-read, WORM, etc.

It will be appreciated that the interaction of the multiple logical zones can change the behavior of the overall storage device. This includes when a second logical zone is accessed the first (or any) logical zones cannot be accessed until the second logical zone is completed with its access. This allows for the host system 502 and the storage device 504 to guarantee the constraints of each logical zone without causing corruption of the other logical zones.

All the logical zones may be stored in the same physical storage media or storage pool. This allows for the storage device to place the corresponding logical zone into the physical zone that best fits the constraints without the host system having to provide extra replication of the storage systems. This means that if a host system 502 requests a second logical zone to have a higher reliability than the first logical zone the storage device may move data from the first logical zone that currently resides in a first physical location with good reliability characteristics into a different second physical location with lower reliability characteristics (still meeting constraints) and then placing the second logical data into the first physical location with the higher reliability characteristics.

The apparatus 502 may include other features related to the zones. For example, the apparatus 502 may define special zone or zones that have a specific life cycle, say of filled (or partially filled) followed by completely empty or trimmed.

The apparatus 502 may restrict access to other zones while the special zones are not empty. The special zones may have a specific quality of service associated with them. A high quality of service may be associated with, among other things, low write latency, high write throughput, short retention time, small number of write cycles, and small number of total bytes written through the life of the device.

The memory zone features of the apparatus 502 may be used in any aspect of device operation, and may be implemented as part of or independently of the power loss operations described above. For example, selected zones may be used in response to power loss events. In such a case, volatile cached data may be written to a designated zone in response to a power loss event. Subsequently, after power is restored, the cached data may be read back and restored where necessary. Thereafter, the blocks that stored the cached data can be returned to whatever purpose it was employed before the power loss event.

In such a power loss event, the system may reduce quality of service on all other zones until data in the designated zone has been completely processed. In one scenario, all other zones might be allowed little if any access while the special zones are be filled (power loss) and slower accesses while the special zones were being emptied (during restoration). This could be done by demoting a quality of service for non-designated zones, and/or defining a first tier quality-of-service that pre-empts all others. In either case, the system may provide limits on the use of the highest level quality of service (e.g., limits on time or amount of memory for highly preemptive tasks) to reserve it for special uses. The quality of service and life cycle requirements for the special zone in the this example can facilitate optimizing the storage device for a particular infrequent but high value case, while not overly extending the drive specifications and avoiding over-designing the drive.

The various embodiments described above may be implemented using circuitry and/or software modules that interact to provide particular results. One of skill in the computing arts can readily implement such described functionality, either at a modular level or as a whole, using knowledge generally known in the art. The structures and procedures shown above are only a representative example of embodiments that can be used to perform functions and processes as described above. For example, the functions described occurring in a single computing device may be distributed over two or more processing devices, and non-volatile memory or other functions components may also be distributed between a plurality of physically separate devices.

The foregoing description of the example embodiments has been presented for the purposes of illustration and description. It is not intended to be exhaustive or to limit the invention to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. A method comprising:
dynamically allocating logical zones within a non-volatile, solid-state memory device, each of the logical zones being differentiated based on any combination of retention, performance, and reliability constraints of physical storage to which the logical zones are mapped, the non-volatile, solid-state memory device comprising an over-provisioned portion that minimizes write amplification in the non-volatile, solid-state memory device, the over-provisioned portion being selected from one of the logical zones;
detecting a power loss condition affecting volatile data that is cached in preparation for storage in the non-volatile, solid-state memory device;
storing the volatile cached data in the over-provisioned portion of the non-volatile, solid-state memory device in response to the power loss condition; and
upon resumption of power, moving the stored cached data from the over-provisioned portion of the non-volatile, solid-state memory device to a provisioned portion of the non-volatile, solid-state memory device to thereafter free the over-provisioned portion for purposes of minimizing write-amplification.

2. The method of claim 1, further comprising performing garbage collection on the over-provisioned portion of the non-volatile, solid-state memory device before storing the volatile cached data.

3. The method of claim 1, wherein the non-volatile, solid-state memory device is acting as a cache for another non-volatile data storage device.

4. An apparatus comprising:
a memory interface configured to access a non-volatile, solid-state memory having an over-provisioned portion that minimizes write amplification in the non-volatile, solid-state memory device; and
a controller configured to:
dynamically allocate logical zones within the non-volatile, solid-state memory device, each of the logical zones being differentiated based on any combination of retention, performance, and reliability constraints of physical storage to which the logical zones are mapped, the over-provisioned portion being selected from one of the logical zones;
detect a power loss condition affecting the apparatus;
access cached data of a volatile memory that stores data in preparation for storage to the non-volatile, solid-state memory;
store the cached data in the over-provisioned portion in response to the power loss condition; and
upon resumption of power, move the stored cached data from the over-provisioned portion of the non-volatile, solid-state memory device to a provisioned portion of the non-volatile, solid-state memory device to thereafter free the over-provisioned portion for purposes of minimizing write-amplification.

5. The apparatus of claim 4, wherein the controller is further configured to perform garbage collection on the over-provisioned portion of the solid-state memory before storing the cached data.

6. The apparatus of claim 4, wherein the apparatus is acting as a cache for another non-volatile data storage device.

7. A method comprising:
dynamically allocating logical zones within a non-volatile, solid-state memory device, each of the logical zones being differentiated based on read/write access constraints and on any combination of retention, performance, and reliability constraints of physical storage to which the logical zones are mapped, the non-volatile, solid-state memory device comprising advertised and over-provisioned portions, the over-provisioned portion minimizing write amplification in the non-volatile, solid-state memory device, the non-volatile, solid-state memory device acting as a cache for a lower tier, non-volatile data storage device;

detecting an unexpected power loss condition affecting volatile data that is cached in preparation for storage in the non-volatile, solid-state memory device;

determining that the advertised portion is unable to accept the volatile data in response to the power loss condition;

in response thereto, storing the volatile cached data in an over-provisioned portion of the non-volatile, solid-state memory device, the over-provisioned portion selected from one of the logical zones; and upon resumption of power, moving the stored cached data from the over-provisioned portion of the non-volatile, solid-state memory device to a provisioned portion of the non-volatile, solid-state memory device to thereafter free the over-provisioned portion for purposes of minimizing write-amplification.

8. The method of claim 7, further comprising performing garbage collection on the over-provisioned portion before storing the volatile cached data.

9. The method of claim 7, further comprising forgoing any movement of data from the non-volatile, solid-state memory device to the lower tier, non-volatile data storage device in response to the power loss condition.

10. The method of claim 1, further comprising, while storing the volatile cached data in the over-provisioned portion, limiting access to ones of the logical zones that do not store the over-provisioned portion.

11. The method of claim 10, wherein limiting access to the ones of the logical zones comprises changing a quality of service of at least one of the logical zones.

12. The method of claim 1, wherein the logical zones are further differentiated by read/write access constraints.

* * * * *